United States Patent [19]

Scheurer et al.

[11] Patent Number: 4,518,768

[45] Date of Patent: May 21, 1985

[54] REMOVAL OF BENZENE FROM CARBOXY POLYMETHYLENE RESIN

[75] Inventors: Heinrich P. Scheurer; Kenneth K. H. Ong, both of Scarborough, Canada

[73] Assignee: Warner-Lambert Company, Morris Plains, N.J.

[21] Appl. No.: 593,328

[22] Filed: Mar. 26, 1984

[30] Foreign Application Priority Data

Apr. 13, 1983 [CA] Canada .................................. 425798

[51] Int. Cl.$^3$ ........................................... C08F 120/02
[52] U.S. Cl. .................... 528/483; 523/100; 528/481; 528/495; 528/496; 528/499; 528/500
[58] Field of Search .............. 528/483, 481, 499, 500, 528/495, 496; 523/100

[56] References Cited

U.S. PATENT DOCUMENTS 3,600,366  8/1971  Heckert ................................ 528/483
4,049,897  9/1977  Houslay ............................... 528/483

Primary Examiner—Lester L. Lee
Attorney, Agent, or Firm—Gary M. Nath; Charles A. Gaglia, Jr.

[57] ABSTRACT

Benzene is removed from carboxy polymethylene resin by dissolving the resin to form a solution and dispersing the solution as fine droplets in a gas phase or aerating the solution to introducing into it a fine dispersion of gas bubbles. The benzene transfer from the solvated resin to the gas phase and a benzene-free resin or solution can be obtained which may be usable in pharmaceutical and food products.

15 Claims, No Drawings

REMOVAL OF BENZENE FROM CARBOXY POLYMETHYLENE RESIN

It is known to use carboxy polymethylene resins as thickening, suspending, dispersing, and emulsifying agents in the preparation of cosmetic materials, printing inks, lubricants, polishes, waxes, paints, and waterproof and oil-proof coating compositions. Usually, the resins, as commercially available, are in solid form and are fluffy, white, mildly acid powders. The properties of these resins also make them desirable ingredients to be employed in the preparation of pharmaceutical compositions and in food products. However, the commercially-available resins contain appreciable quantities of benzene which is a hazardous carcinogenic agent, suspected of causing leukemia. Because of their content of benzene, the resins at present may not be used in food products and their use in pharmaceutical products is subject to certain restrictions. It would therefore be highly desirable to provide carboxy polymethylene materials substantially free of any content of benzene. As far as the applicant is aware, the manufacturers of these resins have been unable to supply the resins in a form, free of any substantial content of benzene, except by modifying the manufacturing process in order to avoid contamination of the product with benzene. This modification of the manufacturing procedure, however, markedly increases the costs of the manufacture. Thus, as available from the manufacturers, the costs of resins having substantially reduced benzene contents are some four times higher than the costs of the same resins containing appreciable quantities of benzene.

The present invention provides a simple and inexpensive procedure for substantially freeing carboxy polymethylene resins of their content of benzene. The invention provides a method for removal of benzene from carboxy polymethylene resin comprising forming a solution phase by dissolving the resin containing contaminant quantities of benzene in a benzene-free liquid solvent therefor, providing a benzene-free gas phase, forming a fine dispersion of one of said phases in the other, maintaining the dispersion for a period sufficient to permit substantially all the benzene in the liquid phase to transfer into the gas phase, and recovering a substantially benzene-free resin product.

With this procedure, resins which may typically have initial contents of about 0.01 to about 0.5% by weight of benzene may readily be rendered substantially benzene-free.

While applicant does not wish to be bound by any theory, it is suggested that, in the solid resin, benzene molecules are entrapped within coiled molecular chains of the resin polymer. On bringing the resin polymer into solution, the polymeric resin molecules become solvated and the polymeric chains partially or fully uncoil releasing the trapped benzene molecules. When the resin solution is brought into intimate contact with the gas phase by forming the fine dispersion referred to above, transfer of the benzene molecules from the solution into the gas phase can take place, thus permitting the resin in the solution phase to be substantially freed of the benzene contaminant.

With the above procedure, the content of benzene in the product may readily be reduced to less than about 0.001% by weight benzene based on the weight of the solid resin. In the preferred forms, the resin product contains no detectable quantity of benzene.

The carboxy polymethylene resins to be employed in the present procedure may be acrylic acid polymers having linear or branched chains and having repeating units conforming generally to the formula indicated below.

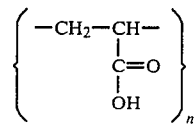

Typically, the molecular weight of the polymer resins will range from about 400,000 to about 4,000,000 and, the value of n in the above formula may typically range from about 5000 to about 50,000. One particularly preferred form of the carboxy polymethylene material to be employed comprises the resins available under the trade mark CARBOPOL from B. F. Goodrich Company, Cleveland, Ohio, U.S.A.

For the purposes of employing the resin in the formulation of pharmaceutical and food compositions, it will normally be desirable to provide the purified, benzene-free material in the form of a concentrated solution or in the form of re-constituted dry resin powder. Desirably, therefore, the solution phase is substantially free of any ingredient other than the resin and the solvent therefor. One exception is that the solution may contain small quantities of antimicrobial preservative agents, such as methylparaben and propylparaben. These preservatives are commonly used in pharmaceutical and food products, and the addition of small quantities of the preservatives does not interfere with the handling of the solutions of the resins or with the benzene-removal procedure, and therefore the inclusion of small quantities of these preservatives may conveniently be made prior to the benzene-removal step. When present, these preservatives will be added to the resin solution in an amount typically less than 0.5% by weight, based on the weight of resin in the solution.

One preferred embodiment of the present method consists in forming the above-mentioned dispersion as a spray of fine droplets of the solution phase in a gas phase constituting the continuous phase. The procedures and techniques which may be employed for forming a fine gasborne dispersion of droplets of a liquid solution are, of course, very well known to those skilled in the art of spray-drying, and similar techniques may be employed in carrying out the present method. As will be appreciated by those skilled in the art, however, even quite dilute solutions of the carboxy polymethylene resins have relatively high viscosities and, further, the resins tend to be of a very hygroscopic nature, thus making it somewhat more difficult to evaporate the solvent from the droplets of solution during their free fall through the gas phase, as would normally be an objective of a conventional spray-drying operation. Further, it will be appreciated that in order to achieve a product which is substantially benze-free the fine liquid droplets must be maintained in contact with the gas phase for a period sufficient to permit substantially all of the benzene in the liquid to transfer into the gas. Such modifications of the conventional spray-drying procedures and equipment as are necessary in order to form efficiently a fine spray of the solution or to dry the solution droplets are, however, well within the capabilities of those skilled in the art of spray-drying, and need not be further discussed in detail herein.

A further preferred form of carrying out the present method consists in forming a dispersion of the gas phase within a continuous phase solution by agitating the solution phase vigorously in the presence of the gas phase e.g. by agitating the resin solution using conventional stirrer, mixer, or blender equipment to aerate the liquid phase. In such case, the agitation and aeration of the liquid solution is maintained for a period sufficient to permit substantially all of the benzene present in the solution to volatilize out from the solution into the gas phase. The removal of the benzene impurity may be accelerated by continuously flowing a stream of benzene-free gas into contact with the solution undergoing treatment and continuously withdrawing benzene-laden gas from the vicinity of the liquid. Thus, for example, a stream of compressed gas may be bubbled continuously through the liquid undergoing treatment. Vacuum may be applied to the liquid in order to enhance and accelerate the benzene-removal. The liquid may be maintained within an enclosure which is at least partially evacuated following the further agitation and aeration of the liquid phase. Continuous treatment of the solution can be achieved by feeding the solution continuously to a modified VERSATOR (trade mark) or similar mixing device, wherein the liquid is continuously agitated and aerated to form a fine dispersion of gas bubbles within the liquid, and with air or other gas being continuously admitted to the device, and an exhaust stream of benzene-laden off-gas being continuously withdrawn from the agitated and aerated liquid under reduced pressure.

Although reference is made herein to "aeration" it will be understood that the gas phase commingled with the liquid phase need not be air. In some cases, it may be desirable to avoid solution of oxygen or other air-components in the solution undergoing treatment, and other gases may be employed e.g. inert gases such as nitrogen, or steam such as saturated steam, super-saturated steam or super-heated steam. References to "aeration" will be understood accordingly.

In the preferred form, the solvent employed for making the resin solution is water. Other solvents may of course be employed. Desirably, the solvent is one in which the resin has a solubility of at least about 10%, more preferably at least about 15%, based on the weight of resin in the solution, whereby relatively concentrated solutions of the resin can be made up, and thus relatively concentrated purified benze-free solutions can be recovered. Further, when high concentrations of the resin are dissolved in the solvent, a lesser expenditure of energy is required to drive the solvent from the solution in the event that a re-constituted dry form of the resin is required. Further examples of suitable solvents include ethanol, glycerol, and propylene glycol, together with mixtures of any of these or mixtures thereof with water.

In the preferred form, the resin solution will contain about 0.1 to about 50% by weight of the resin, based on the weight of the solution. A 0.1% or higher concentration substantially benzene free resin solution may usefully form the basis of a liquid pharmaceutical product, and solutions of at least up to about 50% concentration may readily be formed. The latter concentrates may be employed in the formulation of pharmaceutical and food products. The viscosities of the solutions that are obtained depends on the molecular weight of the resin undergoing treatment, as well as the weight of the resin dissolved in the solution. Typically, however, resin solutions containing more than about 5% by weight of the resin will have a mucilage or dough-like consistency. With the higher molecular weight resins, it may be preferable to employ solutions containing no more than about 15% by weight of the resin as at higher contents of the dissolved solid resin, the viscosity of the resin solution may be so high that there may be difficulties in forming a fine dispersion of bubbles of the gas phase within the liquid phase. Typically, owing to the relatively high viscosity of the solutions, there will be difficulties in spray-drying or otherwise forming a fine droplet dispersion from liquid solutions containing more than about 5% by weight of the resin in solution. Thus, where it is desired to form a fine liquid droplet dispersion of the resin solutions, usually the resin solutions will contain about 5% or less by weight of the resin.

The reaction may be carried out in the cold e.g. with aqueous solutions at temperatures down to about 0° C. The liquid resin phase, the gas phase, or both, may, however, be heated to above-ambient temperatures. The higher the temperature, the more rapid the transfer of the benzene from the liquid phase into the gas phase. While in theory it would be possible to employ solutions at any temperature up to the boiling point of the solvent, in practice the use of excessively high temperatures increases the costs of the process, and may give rise to problems of excessively rapid evaporation of solvent from the solutions. As noted above, where it is desired to provide a purified benzene-free reconstituted solid resin product, these reconstituted solid products may be obtainable by spray-drying the fine liquid droplet dispersion of the resin solution, and in such case the droplets would normally be permitted to fall through an upward flow of a suitable gas heated to above-ambient temperature in order to promote the evaporation of the solvent. While some of the resins are temperature sensitive others are not and with these temperatures up to about 100° C. may be employed greatly elevated temperatures are not, however, necessary, and, typically, where the liquid-gas dispersion is maintained at an above-ambient elevated temperature, elevated temperatures of about 60° to about 70° may be used.

Some illustrative and nonlimiting Examples of methods in accordance with the present invention will now be given.

EXAMPLE 1

10 grams of a carboxy polymethylene resin of approximate molecular weight 1,250,000 and available under the trade mark Carbopol 941, and containing 3085 ppm benzene, was dissolved in 490 grams of water in a 2 liter container, to form a 2% by weight solution, and was mixed continuously using a laboratory mixer equipped with a blade type stirrer. The mixer speed was adjusted so as to thoroughly aerate the solution. Samples of the solution were removed after 5 minutes and 1 hour for benzene analysis. The 5 minute sample contained 504 ppm of benzene (calculated as ppm of the Carbopol 941), while no benzene could be detected in the 1 hour sample.

EXAMPLE 2

200 grams of the Carbopol 941 (containing 3085 ppm benzene) was dissolved in 9800 grams of water in a 15 liter container to form a 2% solution, and the solution was mixed continuously using a laboratory mixer equipped with a blade type stirrer. The mixer speed was set to maximum to aerate the solution as much as possible. Samples of the solution were taken at hourly intervals and analyzed for benzene. After 11 hours mixing the benzene was completely removed from the solution.

EXAMPLE 3

400 grams of the Carbopol 941 (containing 3085 ppm benzene) was dissolved in 19,600 grams of water in a 30 liter container to form a 2% solution and was mixed continuously using two laboratory mixers each equipped with blade type stirrers. The mixer speeds were set to maximum to aerate the solution as much as possible. In addition, the solution was heated to 60°-70° C. and kept at this temperature throughout. Samples of the solution were taken at hourly intervals and analyzed for benzene. After 8 hours mixing the benzene was completely removed from the solution.

EXAMPLE 4

8.73 kilograms of a batch of the Carbopol 941 (containing 4740 ppm benzene) was dissolved in 560 liter of water in a 3800 liter manufacturing tank to form an approximately 1.5% solution. The solution was mixed continuously using a 5 horse-power turbine mixer. The mixer speed was adjusted to thoroughly aerate the solution. In addition, filtered compressed air was passed through the solution via a bottom inlet in the tank, and across the surface of the solution to aid in flushing the benzene from the tank. Samples of the solution were taken after 1, 2 and 3 hours of mixing and aeration, and analyzed for benzene. The amounts of benzene (calculated as ppm of the Carbopol 941) were 326 ppm after 1 hour, 22 ppm after 2 hours, and non-detectable after 3 hours. The benzene was completely removed from the solution after 3 hours of mixing and aeration.

EXAMPLE 5

8.73 kilograms of the Carbopol 941 (containing 4740 ppm benzene) was dissolved in 620 liters of water in a 3800 liter manufacturing tank to form an approximately 1.4% solution. The solution was mixed continuously using a 7.5 HP turbine mixer. The mixer speed was adjusted to thoroughly aerate the solution. In addition, filtered compressed air was passed through the solution via a bottom inlet in the tank, and across the surface of the solution to aid in flushing the benzene from the tank.

Samples of the solution were taken after 4 minutes (immediately after the solution was prepared with the aid of an eductor), and after the first and second hours of mixing and aeration, and analyzed for benzene. The amounts of benzene (calculated as ppm of the Carbopol 941) were 4739 ppm after 4 minutes, 221 ppm after 1 hour, and non-detectable after 2 hours of mixing and aeration. The benzene was completely removed from the solution after 2 hours of mixing and aeration.

The procedures of Examples 4 and 5 can be modified to apply compressed air through the bottom inlet of the tank and to draw a vacuum in the gas space above the solution in the tank. The withdrawal of gases under reduced pressure from above the aerated solution accelerates the removal of benzene from the solutions.

Some further procedures were conducted with solutions containing higher concentrations of the carboxy polymethylene resins.

EXAMPLE 6

50 grams of the Carbopol 941 (containing 3085 ppm benzene) was dissolved in 950 grams of water in a 2 liter container to form a mucilage-like 5% solution and the solution was mixed continuously using a laboratory mixer equipped with a blade type stirrer. The mixer speed was adjusted to thoroughly aerate the solution. In addition, a stream of compressed air was passed across the surface of the solution to aid in the removal of the benzene. Samples of the solution were taken after 1 and 2 hours of mixing and aeration and analyzed for benzene. The amounts of benzene (calculated as ppm of the Carbopol 941) were 20 ppm after 1 hour, and non-detectable after 2 hours of mixing and aeration. The benzene was completely removed from the mucilage-like solution after 2 hours of mixing and aeration.

EXAMPLE 7

50 grams of the Carbopol 941 (containing 3085 ppm benzene) was dissolved in 450 grams of water in a 2 liter container to form a 10% solution having a dough-like consistency. The solution was mixed continuously using a laboratory mixer equipped with a blade type stirrer. The mixer speed was adjusted to thoroughly aerate the solution. In addition, a stream of compressed air was passed across the surface of the dough-like mucilage to aid in the removal of the benzene. A sample of the solution was taken after 1 hour of mixing and aeration, and was analyzed for benzene. Benzene was non-detectable after 1 hour of mixing and aeration. The benzene was completely removed from the solution in less than 1 hour of mixing and aeration.

The following is an example of the treatment of carboxy polymethylene resin of higher molecular weight.

EXAMPLE 8

50 grams of a carboxy polymethylene resin of an approximate molecular weight of 4,000,000 and available under the trade mark Carbopol 940, and containing 589 ppm benzene was dissolved in 950 grams of water in a 2 liter container to form a mucilage-like solution. This was mixed continuously using a laboratory mixer equipped with a blade type stirrer. In addition, a stream of compressed air was passed across the surface of the solution to aid in the removal of the benzene. A sample of the solution was removed after 1 hour of mixing and aeration, and was analyzed for benzene. Benzene was non-detectable after 1 hour of mixing and aeration. The benzene was completely removed from the solution in less than 1 hour of mixing and aeration.

The analytical method employed in the above Examples could detect accurately 10 ppm (0.001%) benzene. The mixing and aeration procedures described in Examples 1 and 4 to 8 were continued for a prolonged period ranging from 1 to 6 hours after the periods mentioned in the Examples. It was considered the benzene content remaining in the solutions were thereby reduced to less than about 1 ppm.

The embodiments of the invention in which an exclusive property or privilege is claimed are defined as follows:

1. Method for removal of benzene from carboxy polymethylene resin comprising:
   (1) forming a solution phase containing about 0.1% to about 50% by weight of the resin, based on the weight of the solution, by dissolving the resin containing contaminant quantities of benzene-free liquid solvent therefor,
   (2) providing a benzene-free gas phase, said gas phase is air, nitrogen, an inert gas, steam or a mixture thereof, (3) forming a fine dispersion of one of said phases in the other,
(4) maintaining the dispersion at a temperature of about 0° C. to about 100° C.,
(5) maintaining the dispersion for a period sufficient to permit substantially all the benzene in the solution phase to transfer into the gas phase, and
(6) recovering a substantially benzene-free resin phase.

2. Method according to claim 1 in which the resin initially contains about 0.01 to about 0.5% by weight of benzene.

3. Method according to claim 2 in which the substantially benzene free resin product contains less than bout 0.001% benzene based on the weight of solid resin.

4. Method as claimed in claim 1 in which a dispersion of the gas phase within a continuous solution phase is formed.

5. Method as claimed in claim 4 in which the dispersion is formed by agitating the liquid phase vigorously in the presence of the gas phase.

6. Method as claimed in claim 4 in which the dispersion is formed within an enclosure which is thereafter at least partially evacuated to withdraw benzene-laden gas from the dispersion.

7. Method as claimed in claim 4, 5, or 6 wherein a stream of gas bubbles is passed through the dispersion.

8. Method as claimed in claim 1 in which a dispersion of a spray of fine droplets of the solution phase is formed within a continuous gas phase.

9. Method as claimed in claim 8 including the step of permitting the solvent to evaporate from the droplets in free fall through the gas phase and recovering a solid benzene-free resin phase.

10. Method as claimed in claim 1, 4 or 8 in which the dispersion is maintained at a temperature of about 60° to about 70° C.

11. Method as claimed in claim 1, 4 or 8 in which the solvent is water, ethanol, glycerol, propylene glycol or a mixture thereof.

12. Method as claimed in claim 1, 4 or 8 in which the solvent is water.

13. Method as claimed in claim 1 in which the solution phase consists substantially wholly of said resin, the solvent and one or more antimicrobial preservatives.

14. Method as claimed in claim 13 in which the preservative is present in an amount less than about 0.5% by weight based on the weight of the resin.

15. Method as claimed in claim 13 in which the solution phase consists substantially wholly of the resin and the solvent.

* * * * *